US010237490B2

(12) United States Patent
Zou

(10) Patent No.: US 10,237,490 B2
(45) Date of Patent: Mar. 19, 2019

(54) SHOOTING METHOD AND SHOOTING DEVICE FOR DYNAMIC IMAGE

(71) Applicant: Nubia Technology Co., Ltd., Shenzhen (CN)

(72) Inventor: Mingshuang Zou, Shenzhen (CN)

(73) Assignee: Nubia Technology Co., Ltd., Shenzhen (CN)

(*) Notice: Subject to any disclaimer, the term of this patent is extended or adjusted under 35 U.S.C. 154(b) by 3 days.

(21) Appl. No.: 15/322,252

(22) PCT Filed: Jun. 5, 2015

(86) PCT No.: PCT/CN2015/080899
§ 371 (c)(1),
(2) Date: Dec. 27, 2016

(87) PCT Pub. No.: WO2015/196920
PCT Pub. Date: Dec. 30, 2015

(65) Prior Publication Data
US 2017/0134632 A1 May 11, 2017

(30) Foreign Application Priority Data
Jun. 27, 2014 (CN) .......................... 2014 1 0299523

(51) Int. Cl.
H04N 5/235 (2006.01)
G06T 7/194 (2017.01)
(Continued)

(52) U.S. Cl.
CPC ............ H04N 5/2355 (2013.01); G06T 7/11 (2017.01); G06T 7/194 (2017.01); G06T 7/90 (2017.01);
(Continued)

(58) Field of Classification Search
CPC ............ H04N 5/2355; H04N 5/23216; H04N 5/2356; H04N 5/23293; H04N 5/272;
(Continued)

(56) References Cited

U.S. PATENT DOCUMENTS 5,781,198 A * 7/1998 Korn ...................... H04N 5/272
345/634
2009/0066802 A1 * 3/2009 Itagaki ............... G06K 9/00785
348/222.1
(Continued)

FOREIGN PATENT DOCUMENTS

CN 101453660 * 6/2009
CN 101453660 A 6/2009
(Continued)

OTHER PUBLICATIONS

International Search Report of PCT/CN2015/080899, dated Sep. 9, 2015.

Primary Examiner — Luong T Nguyen
(74) Attorney, Agent, or Firm — Banner & Witcoff, Ltd.

(57) ABSTRACT

A method for shooting a dynamic image and a shooting apparatus are disclosed. The method includes steps of selecting a dynamic object on a preview, and after the selection is completed, shooting a plurality of photographs; and synthesizing into the dynamic image according to the plurality of shot photographs and the selected dynamic objects. Thereby, an image of only a partial region dynamically changes or only a specified object dynamically changes in the dynamic image, thereby enabling the user to shoot a dynamic image of a character or a dynamic image of a certain object in a certain region in a crowded street. This achieves shooting of a regional dynamic image, increases the fun of shooting, provides unique shooting experience, and further improves
(Continued)

the degree of freedom for creation, and the user can create more personalized works to improve the user's satisfaction.

14 Claims, 4 Drawing Sheets

(51) Int. Cl.
*G06T 7/11* (2017.01)
*G06T 7/90* (2017.01)
*H04N 5/232* (2006.01)
*H04N 5/265* (2006.01)
*H04N 5/272* (2006.01)
*G06T 11/20* (2006.01)
*H04N 5/262* (2006.01)

(52) U.S. Cl.
CPC ......... *G06T 11/206* (2013.01); *H04N 5/2356* (2013.01); *H04N 5/23216* (2013.01); *H04N 5/23293* (2013.01); *H04N 5/265* (2013.01); *H04N 5/2621* (2013.01); *H04N 5/2625* (2013.01); *H04N 5/272* (2013.01); *G06T 2207/10024* (2013.01); *G06T 2207/20104* (2013.01); *G06T 2207/20208* (2013.01); *G06T 2207/20221* (2013.01)

(58) Field of Classification Search
CPC ........... H04N 5/265; G06T 7/11; G06T 7/194; G06T 7/90; G06T 11/206; G06T 2207/20104; G06T 2207/10024; G06T 2207/20208; G06T 2207/20221
See application file for complete search history.

(56) References Cited

U.S. PATENT DOCUMENTS

| | | | | |
|---|---|---|---|---|
| 2011/0043639 | A1* | 2/2011 | Yokohata | H04N 5/232 348/169 |
| 2012/0127346 | A1* | 5/2012 | Sato | H04N 5/272 348/231.99 |
| 2014/0218370 | A1* | 8/2014 | Mishra | G06T 13/00 345/473 |

FOREIGN PATENT DOCUMENTS

| | | |
|---|---|---|
| CN | 101998058 A | 3/2011 |
| CN | 102447832 A | 5/2012 |
| CN | 104023172 A | 9/2014 |
| JP | 2011066717 A | 3/2011 |
| WO | 2013076359 A1 | 5/2013 |

\* cited by examiner

SHOOTING METHOD AND SHOOTING DEVICE FOR DYNAMIC IMAGE

TECHNICAL FIELD

The present disclosure relates to the technical field of camera shooting, and in particular, to a method for shooting a dynamic image and a shooting apparatus.

BACKGROUND

Dynamic images are dynamic pictures or videos, which are obtained by synthesizing a plurality of photographs. As the synthetization is simple and is of a high degree of freedom for creation, it is favored by users. In the related art, when synthetization of a dynamic picture is performed, the entire photograph must be synthesized, and thus, the entire region of the synthesized dynamic picture or video dynamically changes. Therefore, when a user wants to shoot a dynamic image of a character or a dynamic image of a certain object in a certain region in a crowded street, it cannot be achieved in the related technology. Consequently, the degree of freedom for creation which is given by the related technology to users is not high enough, and cannot meet the users' individual needs, and users' satisfaction is not high.

SUMMARY

The primary purpose of the present disclosure is to provide a method for shooting a dynamic image and a shooting apparatus, which are intended to realize the shooting of a regional dynamic image, improve a degree of freedom for creation, and improve users' satisfaction.

In order to achieve the above purpose, the following technical solutions are adopted.

A method for shooting a dynamic image includes steps of:

selecting a dynamic object on a preview of photograph, and after completely selecting a plurality of dynamic objects, shooting a plurality of photographs; and synthesizing into the dynamic image according to the plurality of shot photographs and the plurality of selected dynamic objects.

Alternatively, the step of selecting a dynamic object on a preview of photograph includes:

generating a selection graph on the preview of one photograph according to a user operation instruction; and selecting a region defined by the selection graph as the dynamic object.

Alternatively, the step of synthesizing into the dynamic image according to the plurality of shot photographs and the plurality of selected dynamic objects includes:

selecting one of the plurality of shot photographs as a reference photograph, and extracting an image outside a region in which the dynamic object is located in the reference photograph as a background image;

generating a plurality of new photographs according to the plurality of selected dynamic objects and the background image respectively; and synthesizing the plurality of new photographs into the dynamic image.

Alternatively, the reference photograph is a first or last one of the plurality of shot photographs, or an $n^{th}$ photograph which is preset by a user, where n is a positive integer greater than 0.

Alternatively, the background image has a blank region which is a region where the dynamic object of the reference photograph is located.

Alternatively, the step of generating a plurality of new photographs respectively according to the plurality of selected dynamic objects and the background image includes:

placing the plurality of selected dynamic objects in a blank region of the background image respectively to synthesize into the new photographs with the background image, herein background images of all the new photographs are the same, but images of the dynamic objects are different from each other.

Alternatively, the step of selecting a region defined by the selection graph as the dynamic object includes:

selecting the dynamic object from a photograph for preview according to a coordinate position and an area size of the dynamic object; or when the photograph for preview is shot, labeling a region where the dynamic object is located according to the coordinate position and the area size of the dynamic object, and when the dynamic object is selected, directly selecting the dynamic object according to a label on the photograph.

Alternatively, the step of selecting a dynamic object on a preview includes:

acquiring a color selected by a user, and selecting an object on the preview which matches the color selected by the user as the dynamic object; or selecting an object which is touched or clicked on by the user on the preview as the dynamic object.

Alternatively, the step of synthesizing into the dynamic image according to the plurality of shot photographs and the plurality of selected dynamic objects includes:

selecting one of the plurality of shot photographs as a first reference photograph, and then selecting another one therefrom as a second reference photograph, herein a dynamic object in the second reference photograph does not coincide with a dynamic object in the first reference photograph or has minimum coincidence with the dynamic object in the first reference photograph;

extracting, from the second reference photograph, an image at a position corresponding to a position of the dynamic object of the first reference photograph and overlaying the image at a position of the dynamic object of the first reference photograph to synthesize into a background image;

generating a plurality of new photographs respectively according to the selected dynamic objects and the background image; and synthesizing the plurality of new photographs into the dynamic image.

Alternatively, in a case where the dynamic object moves in the same direction, a first one of the plurality of shot photographs is selected as the first reference photograph, and a last one of the plurality of shot photographs is selected as the second reference photograph; or a first one of the plurality of shot photographs is selected as the second reference photograph, and a last one of the plurality of shot photographs is selected as the first reference photograph.

Alternatively, the step of extracting, from the second reference photograph, an image at a position corresponding to a position of the dynamic object of the first reference photograph and overlaying the image at a position of the dynamic object of the first reference photograph to synthesize into a background image includes:

acquiring a coordinate position and an area size of the dynamic object in the first reference photograph, then extracting, at the same coordinate position in the second reference photograph, an image with the same area and size as those of the dynamic object in the first reference photograph, and overlaying the image on a region where the dynamic object of the first reference photograph is located to synthesize into a new image as the background image.

Alternatively, the step of generating a plurality of new photographs respectively according to the selected dynamic objects and the background image includes:

extracting a dynamic object in a photograph for preview, recording a coordinate position of the dynamic object in the photograph for preview, and then overlaying the dynamic object at a corresponding position in the background image to synthesize into a new photograph.

A shooting apparatus includes a selection module, a shooting module and a synthetization module, herein the selection module is arranged to select a dynamic object on a preview of photograph;

the shooting module is arranged to shoot a plurality of photographs; and the synthetization module is arranged to synthesize into the dynamic image according to the plurality of shot photographs and the plurality of selected dynamic objects.

Alternatively, the selection module is arranged to select a dynamic object on a preview by means of:

generating a selection graph on the preview of one photograph according to a user operation instruction; and selecting a region defined by the selection graph as the dynamic object.

Alternatively, the synthetization module is arranged to synthesize into the dynamic image according to the plurality of shot photographs and the selected dynamic objects by means of:

selecting one of the plurality of shot photographs as a reference photograph, and extracting an image outside a region in which the dynamic object is located in the reference photograph as a background image;

generating a plurality of new photographs according to the selected dynamic objects and the background image respectively; and synthesizing the plurality of new photographs into the dynamic image.

Alternatively, the selection module is arranged to select a dynamic object on a preview by means of:

acquiring a color selected by a user, and selecting an object on the preview which matches the color selected by the user as the dynamic object; or selecting an object which is touched or clicked on by the user on the preview as the dynamic object.

Alternatively, the synthetization module is arranged to synthesize into the dynamic image according to the plurality of shot photographs and the plurality of selected dynamic objects by means of:

selecting one of the plurality of shot photographs as a first reference photograph, and then selecting another one therefrom as a second reference photograph, herein a dynamic object in the second reference photograph does not coincide with a dynamic object in the first reference photograph or has minimum coincidence with the dynamic object in the first reference photograph;

extracting, from the second reference photograph, an image at a position corresponding to a position of the dynamic object of the first reference photograph and overlaying the image at a position of the dynamic object of the first reference photograph to synthesize into a background image;

generating a plurality of new photographs respectively according to the selected dynamic objects and the background image; and synthesizing the plurality of new photographs into the dynamic image.

A computer program includes program instructions which, when executed by a computer, cause the computer to execute any of the methods for shooting a dynamic image described above.

A carrier carries the described computer program.

In the method for shooting a dynamic image according to the technical solutions of the present disclosure, a dynamic object is selected by a user on a preview in user-defined manner, and then shot photographs are synthesized into a dynamic image so that an image of only a partial region dynamically changes or only a specified object dynamically changes in the dynamic image, thereby allowing the user to shoot a dynamic image of a character or a dynamic image of a certain object in a certain region in a crowded street. This achieves shooting of a regional dynamic image, increases the fun of shooting, provides unique shooting experience, and further improves the degree of freedom for creation, and the user can create more personalized works to improve the user's satisfaction.

The implementations of the purposes, the functional features and the advantages of the present disclosure will be further described in combination with embodiments and with reference to the accompanying drawings.

SPECIFIC EMBODIMENTS OF THE PRESENT DISCLOSURE

It is to be understood that the specific embodiments described herein are merely for the purpose of explaining the present disclosure and are not intended to limit the present disclosure.

The method for shooting a dynamic image according to the embodiments of the present disclosure allows a user to select a dynamic object on a preview in a user-defined manner, shoot a plurality of photographs after the selection, and synthesize into a dynamic image according to the plurality of shot photographs and the selected dynamic object. The specific procedure is as follows.

Figure 1:
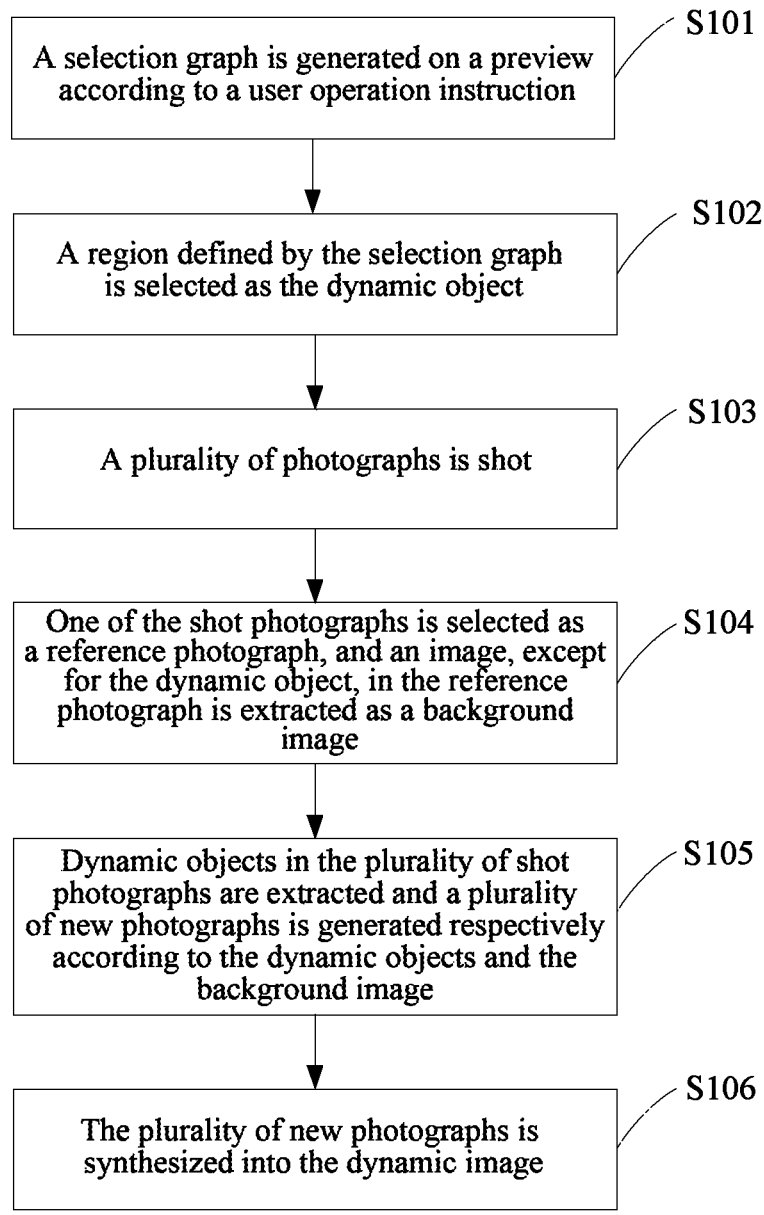
FIG. 1 is a first embodiment of a method for shooting a dynamic image according to the present disclosure.

With reference to FIG. 1, there is provided a first embodiment of a method for shooting a dynamic image according to the present disclosure, including the following steps.

In step S101, a selection graph is generated on a preview of photograph according to a user operation instruction.

A shooting apparatus may provide several selection patterns for selection by a user, which may be rectangular, circular, polygonal etc. The shooting apparatus generates a selection pattern selected by the user on the preview. The user may also draw a selection graph in a user-defined manner, for example, the user swipes directly on the preview, and the shooting apparatus generates a selection pattern according to a swiping trajectory.

The user may also edit the selection graph, for example, adjusting attributes such as a position, a size, a color, a border, transparency etc. of the selection graph.

In step S102, a region defined by the selection graph is selected as the dynamic object.

A coordinate position of the dynamic object on the preview is recorded. At this time, the position of the dynamic object is fixed.

The dynamic object is an object in a photograph which changes dynamically. In this step, it is possible to extract dynamic objects from a plurality of photographs for preview. In this way, a plurality of dynamic objects can be extracted. Positions of the regions where the dynamic objects are located are similarly determined by a fixed coordinate position and an area size in all the photographs, including photographs for preview and subsequent photographs shot for extracting the background image.

In step S103, a plurality of photographs is shot.

A number of the shot photographs may be preset by the user in a user-defined manner. The shooting apparatus may shoot continuously, or may shot once every a preset time.

In step S104, one of the shot photographs is selected as a reference photograph, and an image outside a region in which the dynamic object is located in the reference photograph is extracted as a background image.

The reference photograph may be manually selected by the user or automatically selected by the shooting apparatus. The shooting apparatus may select any one photograph, or select a first or last photograph by default, or the user presets selection of a certain photograph as the reference photograph.

The extracted background image has a blank region which is the region where the dynamic object of the original reference photograph is located.

In step S105, a plurality of new photographs is generated respectively according to the plurality of selected dynamic objects and the background image.

Specifically, each of the extracted dynamic objects is placed in a blank area of the background image, and is synthesized with the background image into a new photograph. The background images of various new photographs are the same, but images of the dynamic objects are different from each other.

When the dynamic object is extracted, it can be extracted from each photograph according to the coordinate position and the area size of the dynamic object; or during shooting, the dynamic object is labeled according to the coordinate position and the area size of the dynamic object, and during extraction, the dynamic object is extracted directly according to a label on the photograph.

In step S106, the plurality of new photographs is synthesized into the dynamic image.

As the background images of various new photographs are the same, but the images of the dynamic objects are different, after the synthetization, only images of the dynamic objects dynamically change, and the remaining regions are static, thereby forming a regional dynamic image. The dynamic image may be a dynamic picture or a dynamic video.

Figure 2:
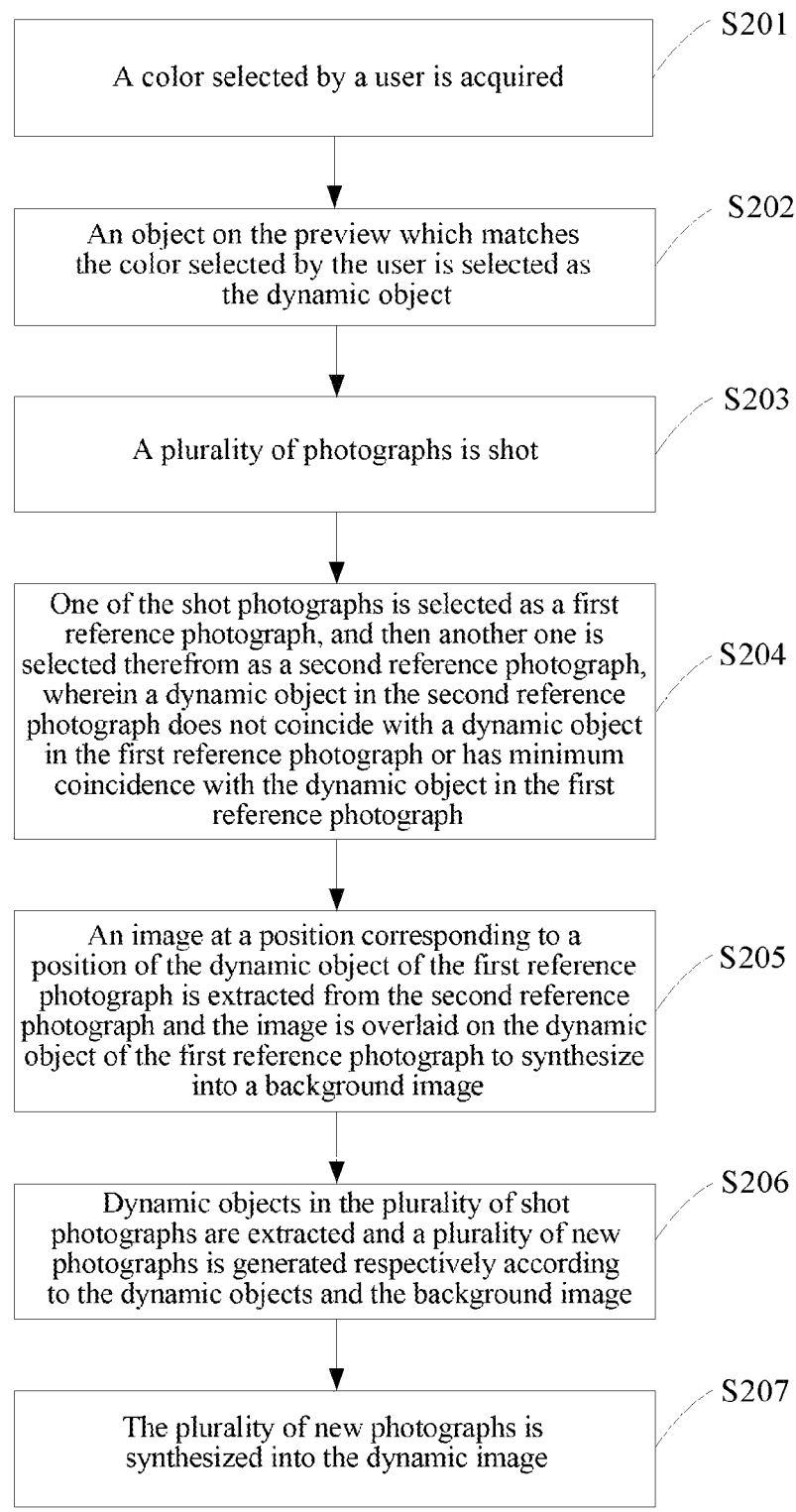
FIG. 2 is a second embodiment of a method for shooting a dynamic image according to the present disclosure.

With reference to FIG. 2, there is proposed a second embodiment of a method for shooting a dynamic image according to the present disclosure, which includes the following steps.

In step S201, a color selected by a user is acquired.

The user may select a color on a color selection disc, or may also select a color on a preview (for example, clicking on or touching at a certain position).

In step S202, an object on the preview which matches the color selected by the user is selected as the dynamic object.

The photographing apparatus searches an object on the preview which has the same color as or similar color to the color selected by the user (the similarity reaches a threshold value), and the object is used as the dynamic object. At this time, the dynamic object may be a moving object, character or animal. The user may adjust a size of a color matching range, in order to limit a number or size of the dynamic objects. When the dynamic object moves, the shooting apparatus tracks the dynamic object according to the color and area of the dynamic object.

In step S203, a plurality of photographs is shot.

In step S204, one of the shot photographs is selected as a first reference photograph, and then another one is selected therefrom as a second reference photograph, herein a dynamic object in the second reference photograph does not coincide with a dynamic object in the first reference photograph or has minimum coincidence with the dynamic object in the first reference photograph.

As the dynamic object is moving, positions of dynamic objects in various photographs are different. It is preferable that two photographs in which dynamic objects do not coincide with each other are selected as the reference photographs. If there are no photographs in which dynamic objects do not coincide with each other, two photographs in which dynamic objects have minimum coincidence are selected. For the case where the dynamic object moves in the same direction, the shooting apparatus automatically selects first and last photographs as the reference photographs.

In step S205, an image at a position corresponding to a position of the dynamic object of the first reference photograph is extracted from the second reference photograph and the image is overlaid on the dynamic object of the first reference photograph to synthesize into a background image.

Specifically, the shooting apparatus acquires the coordinate position and the area size of the dynamic object in the first reference photograph, and then extracts an image of the same area size as that of the dynamic object at the same coordinate position of the second reference photograph, and finally overlays the extracted image on the dynamic object of the first reference photograph to synthesize into a new image as the background image. At this time, there is no dynamic object in the background image, which makes the background more real.

In some embodiments, the image at a position corresponding to the position of the dynamic object of the second reference photograph may also be extracted from the first reference photograph and overlaid on the dynamic object of the second reference photograph to be synthesized into the background image.

In step S206, dynamic objects in the plurality of shot photographs are extracted and a plurality of new photographs is generated respectively according to the dynamic objects and the background image.

Specifically, a dynamic object in each photograph is extracted and a coordinate position of the dynamic object in the photograph is recorded. Then, the dynamic object is overlaid at a corresponding position of the background image to be synthesized into a new photograph. Positions or/and shapes of dynamic objects in various new photographs are different.

In step S207, the plurality of new photographs is synthesized into the dynamic image.

In the synthesized dynamic image, only the specified dynamic objects dynamically change, and the remaining images remains static, thereby forming a regional dynamic image.

Figure 3:
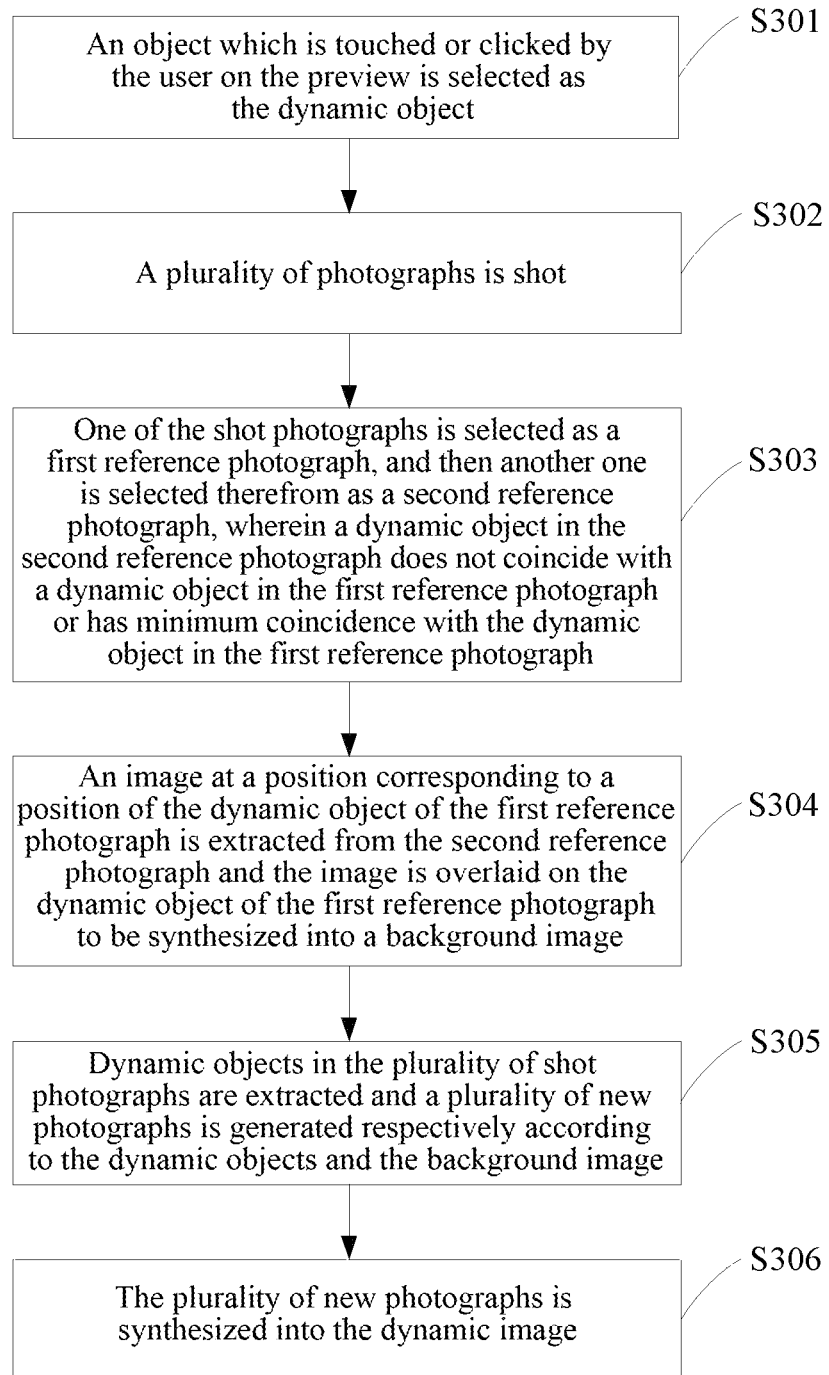
FIG. 3 is a third embodiment of a method for shooting a dynamic image according to the present disclosure.

With reference to FIG. 3, there is proposed a third embodiment of a method for shooting a dynamic image according to the present disclosure, which includes the following steps.

In step S301, an object which is touched or clicked on by the user on the preview is selected as the dynamic object.

The user may touch or click on a person or an object on the preview. The shooting apparatus automatically locks the person or object as a dynamic object according to the technologies such as face recognition or edge recognition etc. in the related technology and tracks the dynamic object. At this time, the dynamic object is also moving.

In step S302, a plurality of photographs is shot.

In step S303, one of the shot photographs is selected as a first reference photograph, and then another one is selected therefrom as a second reference photograph, herein a dynamic object in the second reference photograph does not coincide with a dynamic object in the first reference photograph or has minimum coincidence with the dynamic object in the first reference photograph.

In step S304, an image at a position corresponding to a position of the dynamic object of the first reference photograph is extracted from the second reference photograph and the image is overlaid on the dynamic object of the first reference photograph to be synthesized into a background image.

In step S305, dynamic objects in the plurality of shot photographs are extracted and a plurality of new photographs is generated respectively according to the dynamic objects and the background image.

In step S306, the plurality of new photographs is synthesized into the dynamic image.

An example will now be described.

After a camera module is entered, a dynamic image shooting function is selected, and then options such as "fixed region selection", "automatic color matching", "automatic character recognition" etc. are provided. When a user selects "fixed region selection", the user defines a region on a preview, then long-presses on a camera button to shoot photographs, and releases the camera button to stop shooting photographs. The shooting apparatus then automatically synthesizes into a dynamic image in which only the region dynamically changes. If the user selects "automatic color matching", the user clicks at a certain position in the preview, and the shooting apparatus performs automatic matching to obtain an object according to a color at the selected position. Then, the user long-presses a camera button to shoot photographs, and releases the camera button. The shooting apparatus then automatically synthesizes into a dynamic image in which only the object dynamically changes. If the user selects "automatic character recognition", the user clicks at a certain position in the preview, and the shooting apparatus automatically selects an object at the position. Then, the user long-presses a camera button to shoot photographs, and releases the camera button. The shooting apparatus then automatically synthesizes into a dynamic image in which only the object dynamically changes.

Accordingly, in the method for shooting a dynamic image according to the present disclosure, a dynamic object is selected by a user on a preview in user-defined manner, and then shot photographs are synthesized into a dynamic image so that an image of only a partial region dynamically changes or only a specified object dynamically changes in the dynamic image. This achieves shooting of a regional dynamic image, increases the fun of shooting, provides unique shooting experience, and further improves the degree of freedom for creation, and the user can create more personalized works to improve the user's satisfaction.

Figure 4:
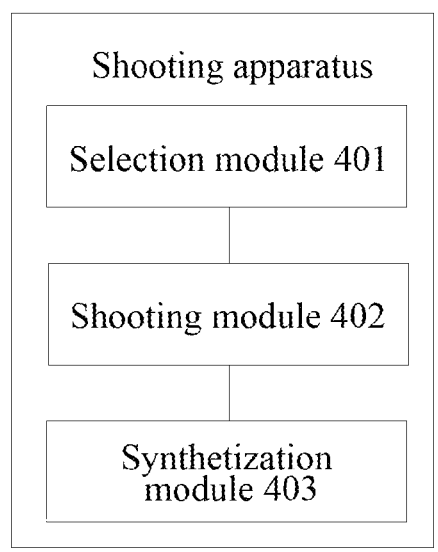
FIG. 4 is a structural block diagram of an embodiment of a shooting apparatus according to the present disclosure.

With reference to FIG. 4, there is proposed an embodiment of a shooting apparatus according to the present disclosure. The shooting apparatus includes a selection module 401, a shooting module 402, and a synthetization module 403.

The selection module 401 is arranged to select a dynamic object on a preview. The dynamic object may be at a fixed position on the preview, or may also dynamically move on the preview.

The selection module 401 may generate a selection graph on the preview according to a user operation instruction, and select a region defined by the selection graph as the dynamic object. At this time, the dynamic object is at a fixed position on the preview.

The selection module 401 may also acquire a color selected by a user, and select an object on the preview which matches the color selected by the user as the dynamic object; and may also select an object which is touched or clicked on by the user on the preview as the dynamic object. At this time, the dynamic object dynamically moves on the preview, and the selection module 401 needs to track the dynamic object.

The shooting module 402 is arranged to shoot a plurality of photographs. A number of the shot photographs may be preset by the user in a user-defined manner. The shooting module may shoot continuously, or may shoot once every a preset time.

The synthetization module 403 is arranged to synthesize into the dynamic image according to the plurality of shot photographs and the selected dynamic objects.

When the dynamic object is fixed at a certain position in the preview, the synthetization module 403 selects one of the shot photographs as a reference photograph, and extracts an image except for the dynamic object in the reference photograph as a background image; extracts dynamic objects in the plurality of shot photographs, and generates a plurality of new photographs respectively according to the dynamic objects and the background image; and synthesizes the plurality of new photographs into the dynamic image.

The synthetization module is arranged to select a reference photograph by selecting the reference photograph as a first or last one of the plurality of shot photographs or an $n^{th}$ photograph which is preset by a user, where n is a positive integer greater than 0.

Herein, the background image has a blank region which is a region where the dynamic object of the reference photograph is located.

The synthetization module 403 is arranged to generating a plurality of new photographs respectively according to the plurality of selected dynamic objects and the background image by:

placing the plurality of selected dynamic objects in a blank region of the background image respectively to synthesize into the new photographs with the background image, herein background images of all the new photographs are the same, but images of the dynamic objects are different from each other.

The selection module 401 is arranged to select a region defined by the selection graph as the dynamic object by:

selecting the dynamic object from a photograph for preview according to a coordinate position and an area size of the dynamic object; or when the photograph for preview is shot, labeling a region where the dynamic object is located according to the coordinate position and the area size of the dynamic object, and when the dynamic object is selected, directly selecting the dynamic object according to a label on the photograph.

When the dynamic object dynamically moves on the preview, the synthetization module 403 selects one of the shot photographs as a first reference photograph, and then selects another one therefrom as a second reference photograph, herein a dynamic object in the second reference photograph does not coincide with a dynamic object in the first reference photograph or has minimum coincidence with the dynamic object in the first reference photograph; extracts, from the second reference photograph, an image at a position corresponding to a position of the dynamic object of the first reference photograph and overlays the image on the dynamic object of the first reference photograph to synthesize into a background image; extracts dynamic objects in the plurality of shot photographs and generates a plurality of new photographs respectively according to the dynamic objects and the background image; and synthesizes the plurality of new photographs into the dynamic image.

The synthetization module 403 is arranged to select a reference photograph by: for a case where the dynamic object moves in the same direction, selecting a first one of the plurality of shot photographs as the first reference photograph, and selecting a last one of the plurality of shot photographs as the second reference photograph; or selecting a first one of the plurality of shot photographs as the second reference photograph, and selecting a last one of the plurality of shot photographs as the first reference photograph.

The synthetization module 403 is arranged to extract, from the second reference photograph, an image at a position corresponding to a position of the dynamic object of the first reference photograph and overlay the image at a position of the dynamic object of the first reference photograph to synthesize into a background image by:

acquiring a coordinate position and an area size of the dynamic object in the first reference photograph, then extracting, at the same coordinate position in the second reference photograph, an image with the same area and size as those of the dynamic object in the first reference photograph, and overlaying the image on a region where the dynamic object of the first reference photograph is located to synthesize into a new image as the background image.

The synthetization module 403 is arranged to generate a plurality of new photographs respectively according to the selected dynamic objects and the background image by:

extracting a dynamic object in a photograph for preview, recording a coordinate position of the dynamic object in the photograph for preview, and then overlaying the dynamic object at a corresponding position in the background image to synthesize into a new photograph.

The technical features of the method embodiments described above are applicable to the present apparatus, and will not be repeated here.

Accordingly, in the shooting apparatus according to the present disclosure, a dynamic object is selected by a user on a preview in user-defined manner, and then shot photographs are synthesized into a dynamic image so that an image of only a partial region dynamically changes or only a specified object dynamically changes in the dynamic image. This achieves shooting of a regional dynamic image, increases the fun of shooting, provides unique shooting experience, and further improves the degree of freedom for creation, and the user can create more personalized works to improve the user's satisfaction.

The embodiments of the present disclosure further disclosure a computer program including program instructions which, when executed by a computer, cause the computer to execute any of the methods for shooting a dynamic image described above.

The embodiments of the present disclosure further disclosure a carrier carrying the described computer program.

It is to be illustrated that when the shooting apparatus according to the above embodiment shoots a dynamic image, it is described only by taking division of the above various functional modules as an example. In practical applications, the above functions described above can be allocated to be performed by different functional modules as required. In addition, the shooting apparatus according to the above embodiment and the method for shooting a dynamic image belong to the same concept, and the detailed implementation process thereof can be known with reference to the method embodiments, and will not be repeated here.

It can be understood by those of ordinary skill in the art that all or a part of the steps in the implementations of the methods according to the above embodiments can be implemented by a program controlling related hardware. The program can be stored in a computer-readable storage medium which may be a ROM/RAM, a magnetic disk, an optical disk etc.

It should be understood that the above description is only the embodiments of the present disclosure, and cannot used to limit the patent scope of the present disclosure. Equivalent structure changes or equivalent flow changes which are made using content of the description and the accompanying drawings of the present disclosure and are directly or indirectly applied in other related technical fields, should be similarly contained within the patent protection scope of the present disclosure.

INDUSTRIAL APPLICABILITY

In the method for shooting a dynamic image according to the technical solutions of the present disclosure, a dynamic object is selected by a user on a preview in user-defined manner, and then shot photographs are synthesized into a dynamic image, so that an image of only a partial region dynamically changes or only a specified object dynamically changes in the dynamic image, thereby enabling the user to shoot a dynamic image of a character or a dynamic image of a certain object in a certain region in a crowded street. This achieves shooting of a regional dynamic image, increases the fun of shooting, provides unique shooting experience, and further improves the degree of freedom for creation, and the user can create more personalized works to improve the user's satisfaction. Therefore, the present disclosure has very strong industrial applicability.

What is claimed is:

1. An image processing method, comprising steps of:
   selecting at least one dynamic object on a preview of one photograph;
   shooting a plurality of photographs including the dynamic object; and
   synthesizing a dynamic image according to the plurality of shot photographs and the dynamic object;
   wherein selecting at least one dynamic object on the preview of one photograph comprises:

generating a selection graph on the preview of one photograph according to a user operation instruction; and selecting a region defined by the selection graph as the at least one dynamic object;

wherein synthesizing the dynamic image according to the plurality of shot photographs and the dynamic object comprises:

selecting one of the plurality of shot photographs as a reference photograph;

extracting an image outside the region in which the dynamic object is located in the reference photograph as a background image;

extracting images of the dynamic object from the plurality of shot photographs;

generating a plurality of new photographs according to the images of the dynamic object and the background image; and synthesizing the plurality of new photographs into the dynamic image.

2. The image processing method according to claim 1, wherein the reference photograph is a first or last one of the plurality of shot photographs, or an nth photograph which is preset by a user, where n is a positive integer greater than 0.

3. The image processing method according to claim 1, wherein the background image has a blank region which is a region where the dynamic object of the reference photograph is located.

4. The image processing method according to claim 3, wherein generating the plurality of new photographs according to the images of the dynamic object and the background image comprises:

placing each of the images of the dynamic object in the blank region of the background image to synthesize into the new photographs with the background image, wherein background images of all the new photographs are the same, but the images of the dynamic object are different from each other.

5. The image processing method according to claim 1, wherein selecting the region defined by the selection graph as at least one dynamic object comprises:

selecting the dynamic object from a photograph for preview according to a coordinate position and an area size of the dynamic object; or when the photograph for preview is shot, labeling a region where the dynamic object is located according to the coordinate position and the area size of the dynamic object, and when the dynamic object is selected, directly selecting the dynamic object according to a label on the photograph.

6. The image processing method according to claim 1, wherein selecting at least one dynamic object on the preview of one photograph comprises:

acquiring a color selected by a user, and selecting an object on the preview which matches the color selected by the user as the dynamic object; or selecting an object which is touched or clicked on by the user on the preview as the dynamic object.

7. The image processing method according to claim 6, wherein synthesizing the dynamic image according to the plurality of shot photographs and the dynamic object comprises:

selecting one of the plurality of shot photographs as a first reference photograph, and then selecting another one therefrom as a second reference photograph, wherein an image of the dynamic object in the second reference photograph does not coincide with an image of the dynamic object in the first reference photograph or has a minimum coincidence with the image of the dynamic object in the first reference photograph;

extracting, from the second reference photograph, a process image at a position corresponding to a position of the dynamic object of the first reference photograph and overlaying the process image at a position of the dynamic object of the first reference photograph to synthesize into a background image.

8. The image processing method according to claim 7, wherein in a case where the dynamic objects move in the same direction, a first one of the plurality of shot photographs is selected as the first reference photograph, and a last one of the plurality of shot photographs is selected as the second reference photograph; or a first one of the plurality of shot photographs is selected as the second reference photograph, and a last one of the plurality of shot photographs is selected as the first reference photograph.

9. The image processing method according to claim 7, wherein the extracting, from the second reference photograph, a process image at a position corresponding to a position of the dynamic object of the first reference photograph and overlaying the process image at a position of the dynamic object of the first reference photograph to synthesize into a background image comprises:

acquiring a coordinate position and an area size of the dynamic object in the first reference photograph, then extracting, at the same coordinate position in the second reference photograph, the process image with the same area and size as those of the dynamic object in the first reference photograph, and overlaying the process image on a region where the dynamic object of the first reference photograph is located to synthesize into a new image as the background image.

10. The image processing method according to claim 7, wherein the generating a plurality of new photographs according to the images of the dynamic object and the background image comprises:

recording a coordinate position of the dynamic object in each of the shot photographs for preview, and then overlaying the dynamic object at a corresponding position in the background image to synthesize into a new photograph.

11. An image processing apparatus, comprising:
a computer; and
a non-transitory computer readable storage medium storing instructions that, when executed by the computer, cause the computer to perform steps comprising:

selecting at least one dynamic object on a preview of one photograph;

shooting a plurality of photographs including the dynamic object; and synthesizing a dynamic image according to the plurality of shot photographs and the dynamic object;

wherein the selecting at least one dynamic object on the preview of one photograph comprises:

generating a selection graph on the preview of one photograph according to a user operation instruction; and selecting a region defined by the selection graph as the at least one dynamic object;

wherein synthesizing the dynamic image according to the plurality of shot photographs and the dynamic object comprises:

selecting one of the plurality of shot photographs as a reference photograph;

extracting an image outside the region in which the dynamic object is located in the reference photograph as a background image;

extracting images of the dynamic object from the plurality of shot photographs;

generating a plurality of new photographs according to the images of the dynamic object and the background image; and synthesizing the plurality of new photographs into the dynamic image.

12. The image processing apparatus according to claim 11, wherein selecting at least one dynamic object on the preview of one photograph comprises:

acquiring a color selected by a user, and selecting an object on the preview which matches the color selected by the user as the dynamic object; or selecting an object which is touched or clicked on by the user on the preview as the dynamic object.

13. The image processing apparatus according to claim 11, wherein synthesizing the dynamic image according to the plurality of shot photographs and the dynamic object comprises:

selecting one of the plurality of shot photographs as a first reference photograph, and then selecting another one therefrom as a second reference photograph, wherein an image of the dynamic object in the second reference photograph does not coincide with an image of the dynamic object in the first reference photograph or has a minimum coincidence with the image of the dynamic object in the first reference photograph;

extracting, from the second reference photograph, a process image at a position corresponding to a position of the dynamic object of the first reference photograph and overlaying the process image at a position of the dynamic object of the first reference photograph to synthesize into a background image;

generating a plurality of new photographs according to the images of the dynamic object and the background image; and synthesizing the plurality of new photographs into the dynamic image.

14. A non-transitory computer readable storage medium comprising program instructions which, when executed by a computer, cause the computer to execute the image processing method according to claim 1.

* * * * *